United States Patent
Müller et al.

(10) Patent No.: US 12,252,926 B2
(45) Date of Patent: Mar. 18, 2025

(54) SYSTEM, LAVATORY, AIRPLANE AND METHOD FOR CONTROLLING A LAVATORY DOOR BY A USER AND AUTHORIZED ENTITIES

(71) Applicants: Diehl Aviation Laupheim GmbH, Laupheim (DE); Diehl Aviation Gilching GmbH, Gilching (DE)

(72) Inventors: Björn Müller, Hamburg (DE); Florian Zager-Rode, Buxtehude (DE); Jörg Engelhardt, Hamburg (DE)

(73) Assignees: Diehl Aviation Laupheim GmbH, Laupheim (DE); Diehl Aviation Gilching GmbH, Gilching (DE)

( * ) Notice: Subject to any disclaimer, the term of this patent is extended or adjusted under 35 U.S.C. 154(b) by 164 days.

(21) Appl. No.: 17/967,013

(22) Filed: Oct. 17, 2022

(65) Prior Publication Data
US 2023/0047605 A1 Feb. 16, 2023

Related U.S. Application Data

(63) Continuation of application No. PCT/EP2021/060467, filed on Apr. 22, 2021.

(30) Foreign Application Priority Data

Apr. 24, 2020 (DE) .................... 10 2020 205 215.8

(51) Int. Cl.
*E05F 15/73* (2015.01)
*B64D 11/02* (2006.01)
(Continued)

(52) U.S. Cl.
CPC .............. *E05F 15/73* (2015.01); *B64D 11/02* (2013.01); *E05B 47/0012* (2013.01);
(Continued)

(58) Field of Classification Search
CPC ... E05F 15/73; E05F 15/611; E05F 2015/765; B64D 11/02; E05B 47/0012;
(Continued)

(56) References Cited

U.S. PATENT DOCUMENTS

| 4,994,722 A * | 2/1991 | Dolan ................... E05B 47/00 340/565 |
| 7,984,875 B2 * | 7/2011 | Koehn ................... B64D 11/02 244/129.5 |
| 8,074,271 B2 * | 12/2011 | Davis ....................... G07C 9/29 726/16 |
| 8,141,296 B2 * | 3/2012 | Bem ................... E05B 65/0035 49/340 |

(Continued)

FOREIGN PATENT DOCUMENTS

| DE | 102014105565 A1 | 10/2015 |
| DE | 102015226354 A1 | 6/2017 |

(Continued)

*Primary Examiner* — Nam V Nguyen
(74) *Attorney, Agent, or Firm* — Laurence A. Greenberg; Werner H. Stemer; Ralph E. Locher (57) ABSTRACT

A control and information system is for a lavatory of an aircraft, where the lavatory has a door. The system contains a door actuator for opening and closing, a lock actuator for locking and unlocking the door, a control device for controlling the door actuator and the lock actuator, a human-machine interface for actuating the door by a user, as well as a communication interface for exchanging information between an authorized entity and the control device. The lavatory contains a wall structure supporting the door, and the control and information system. A user controls the door via the human-machine interface. Information about the communication interface is exchanged between the control device and the authorized entity.

18 Claims, 4 Drawing Sheets

(51) Int. Cl.
*E05B 47/00* (2006.01)
*E05B 65/00* (2006.01)
*E05F 15/611* (2015.01)
*G07C 9/00* (2020.01)
*G07C 9/20* (2020.01)

(52) U.S. Cl.
CPC ........ *E05B 65/0035* (2013.01); *E05F 15/611* (2015.01); *G07C 9/00174* (2013.01); *G07C 9/20* (2020.01); *E05B 2047/0037* (2013.01); *E05B 2047/0069* (2013.01); *E05F 2015/765* (2015.01); *E05Y 2201/434* (2013.01); *E05Y 2400/40* (2013.01); *E05Y 2400/44* (2013.01); *E05Y 2400/818* (2013.01); *E05Y 2400/858* (2013.01); *E05Y 2800/10* (2013.01); *E05Y 2900/502* (2013.01)

(58) Field of Classification Search
CPC ........ E05B 65/0035; E05B 2047/0037; E05B 2047/0069; G07C 9/00174; G07C 9/20; G07C 2209/04; G07C 2209/62; G07C 9/00896; E05Y 2201/434; E05Y 2400/40; E05Y 2400/44; E05Y 2400/818; E05Y 2400/858; E05Y 2800/10; E05Y 2900/502
USPC ........................................ 340/5.72
See application file for complete search history.

(56) References Cited

U.S. PATENT DOCUMENTS

| | | | | |
|---|---|---|---|---|
| 8,169,317 | B2 * | 5/2012 | Lemerand | E05F 15/70 340/521 |
| 8,888,045 | B2 * | 11/2014 | Boren | E05F 15/00 244/129.5 |
| 10,282,927 | B1 * | 5/2019 | Hutz | G07C 9/20 |
| 10,287,801 | B1 * | 5/2019 | Huang | E05B 45/06 |
| 10,629,019 | B2 * | 4/2020 | Neely | G07C 9/00571 |
| 10,829,955 | B2 | 11/2020 | Hawle et al. | |
| 10,955,822 | B2 * | 3/2021 | Kimura | G08B 21/0492 |
| 2005/0073425 | A1 * | 4/2005 | Snell | E05F 3/224 340/545.1 |
| 2011/0316703 | A1 * | 12/2011 | Butler | G08B 21/245 340/573.1 |
| 2019/0034679 | A1 | 1/2019 | Schadow et al. | |
| 2020/0164988 | A1 * | 5/2020 | Alvarez | B64D 45/00 |

FOREIGN PATENT DOCUMENTS

| | | | | |
|---|---|---|---|---|
| DE | 102018113132 | A1 | 12/2019 | |
| DE | 102018117978 | A1 | 1/2020 | |
| EP | 3659919 | A1 * | 6/2020 | ............ A61L 2/10 |
| EP | 3919707 | A1 * | 12/2021 | ........... B64C 1/1407 |
| WO | 2019228594 | A1 | 12/2019 | |

* cited by examiner

SYSTEM, LAVATORY, AIRPLANE AND METHOD FOR CONTROLLING A LAVATORY DOOR BY A USER AND AUTHORIZED ENTITIES

CROSS-REFERENCE TO RELATED APPLICATION

This application is a continuation, under 35 U.S.C. § 120, of copending International Patent Application PCT/EP2021/060467, filed Apr. 22, 2021, which designated the United States; this application also claims the priority, under 35 U.S.C. § 119, of German Patent Application DE 10 2020 205 215.8, filed Apr. 24, 2020; the prior applications are herewith incorporated by reference in their entireties.

FIELD AND BACKGROUND OF THE INVENTION

The invention relates to a lavatory of an aircraft, which lavatory has a door.

It is known from existing practice to open, close and lock doors for bathrooms (lavatory, on-board toilet) in airplanes by hand.

Published, non-prosecuted German patent application DE 10 2018 113 132 A1 discloses an apparatus for operating a door for toilet cabins on board vehicles, which is configured for a toilet cabin on board vehicles. The apparatus is equipped with a control panel for generating a control signal depending on the operator action of an occupant of the vehicle and with an actuating device for electromotive actuation of a toilet door in a vehicle depending on the control signal. In addition, the control panel has at least one sensor arrangement for detecting a gesture by the occupant, so that the control signal can be generated on the basis of a detected gesture. This enables the device to be operated in a touch-free manner, for example by means of a hand movement, and avoids surfaces or operating elements being touched, thus enabling extremely hygienic operation of doors of on-board toilets.

SUMMARY OF THE INVENTION

The object of the present invention is to propose improvements in connection with a door of a lavatory of an aircraft.

The object is achieved by a control and information system as claimed in the independent claim. Preferred or advantageous embodiments of the invention as well as other categories of the invention are obtained from the additional claims, the following description and the attached figures.

With the foregoing and other objects in view there is provided, in accordance with the invention, a control and information system for a lavatory of an aircraft, wherein the lavatory has a door. The control and information system contains a door actuator for opening and closing the door, a lock actuator for locking and unlocking the door, a controller for controlling the door actuator and the lock actuator, at least one human-machine interface for detecting a triggering action relating to the door by a user of the door and for transmitting the triggering action to the controller as a trigger signal, and at least one communication interface for transferring input information to the controller from an authorized entity different to the user.

The object of the invention is a control and information system, which is configured or intended for use in a lavatory of an aircraft. It is assumed that the lavatory has a door in the form of an access door through which persons can enter the lavatory. For example, the door is configured as a folding door. Optionally, the door has a plurality of door leaves that can be pivotably connected to one another by at least one hinge. Preferably, the lavatory can be integrated into an aircraft cabin. The term "lavatory" can be understood in a broad sense, and the lavatory can therefore be a "bathroom", a toilet and/or shower room, a changing cubicle, a resting area which can be closed by a door, or similar, which is intended to be used normally by users, in particular passengers of the aircraft, at least temporarily. "Normally" means that each user is entitled to enter or leave the room by opening the unlocked door and to lock or unlock the door from inside.

The control and information system contains at least one door actuator designed to open and close the door. For example, the door actuator contains a drive unit formed of an electric motor and a transmission, which is configured to generate and transmit a torque to the hinges of the door, in particular the folding door.

The control and information system also contains at least one lock actuator which is configured to lock and unlock the door. For example, the lock actuator contains an electric motor and a locking element, such as a locking bolt. In particular, the electric motor is configured to move the locking element into a locking position to lock the doors.

The control and information system contains a control device. The control device is configured to control the door actuators and the lock actuators. The control device preferably contains a housing that accommodates a controller, motor drivers for driving electric motors of the door actuator and the lock actuator, a memory, a power connection to an aircraft power supply, discrete inputs and outputs, and/or data bus interfaces of the control device.

The control and information system also contains a human-machine interface, which in particular contains a sensor device. The human-machine interface, in particular the sensor device, is configured to detect a triggering action relating to the door, in particular to the door actuator and/or the lock actuator, by a user of the door, e.g. a passenger of the aircraft who wishes to open/close/lock/unlock the door, and to transmit the triggering action to the control device as a trigger signal. The control device then converts the relevant trigger signal into the relevant desired action (opening, closing, locking, unlocking) of the door.

The triggering action and the associated trigger signal act on the door actuator and/or the lock actuator, depending on the action desired by the user based on the triggering action. Different trigger signals are thus generated by different triggering actions in the form of user interactions with the human-machine interface, e.g. operating various buttons, such as "Open door", "Unlock door" etc. These exclusively involve the normal operation of the door. "Normal" means, in particular, locking or unlocking the door or opening or closing it, as explained below, referred to in brief as "operating the door". "Normal" in this context means that the person concerned in the form of the user does not need any special authorization to operate the door in this form. Normal operation without authorization allows, in particular, opening an unlocked door from outside the lavatory, closing the door from outside the lavatory, opening and closing the door from inside the lavatory, and locking and unlocking the door from inside the lavatory.

A user is any person who has no special authorization in relation to the door and its associated components (display, human-machine interface), in particular all passengers. However, users may also be other persons occupying the aircraft, such as ground personnel, flight personnel, crew, etc. If they do not have such special authorization, these people are also to be understood as unauthorized "users". The user therefore has "standard rights" in relation to the door.

In addition to the unauthorized user, there are also so-called authorized entities. These are persons or units that have special authorization in relation to the door. The authorized entities include persons in the form of the aircraft's flight personnel, such as the flight attendants or the crew: pilot, co-pilot, . . . ). These are also persons in the form of service personnel, such as cleaning or maintenance staff, who are authorized to be present on the aircraft in order to carry out duties there. Additionally, the authorized entity may also be a data-processing device or system, in particular the aircraft's on-board network or its components which are configured to control the door. In particular, the "on-board network" refers to the data-processing components of the aircraft, such as its on-board computer, flight computer, cabin management system, etc.

In contrast to the user, all of these authorized entities, i.e. authorized persons or devices etc., have a special authorization in relation to the door and its associated components, such as the human-machine interface. The authorization also applies to the operation, configuration, etc. of all these components. This relates in particular to the possibility of also locking or unlocking the door from outside the lavatory, configuring the human-machine interface or its display etc. None of these activities is permitted for the normal user, but are necessary or useful, for example, for service purposes, in emergencies, etc. The authorized entities thus have "special rights" in relation to the door.

The authorized persons can act as authorized entities by using their authorization. However, they can also act as "normal users" if, for example, they use the human-machine interface as a user without using their authorization.

Authorization is in particular the use of a password, an RFID chip, an authorized Bluetooth or WLAN connection to the human-machine interface, to a communication interface (see below), etc.

In addition to the user, the above-mentioned triggering action can therefore also be performed by persons who belong to the authorized entity. For example, on-board personnel can operate the door like any other user via the human-machine interface, but in doing so they are limited to the unauthorized options.

Preferably, the control device is configured to control the door actuator and the lock actuator during and/or after the transmission of the trigger signal. In particular, the control device can control the door actuator depending on a door position and/or the lock actuator depending on a position of the locking element. In particular, the door actuator and/or the lock actuator are energized position-dependently, i.e. dependent on their current position, e.g. also in order to generate a torque which implements a movement profile.

It is provided that the control and information system also comprises at least one communication interface, which is different from the human-machine interface but can be integrated into it, see below. The communication interface is configured to transmit input information from the authorized entity to the control device. As an additional option, the communication interface is also designed to transmit output information from the control device to the authorized entity. Preferably, the communication interface is configured to exchange input information and output information between the authorized entity and the control device. The exchange can take place, for example, in both directions. In particular, communication is possible between the control device and the authorized entity, in which the communication relates to the lavatory and/or the aircraft in which the lavatory is integrated.

The authorized entity is thus not the unauthorized user of the door, in particular not the passenger of the aircraft, but a person authorized in the context of the door. It may also be a similarly authorized electronic device of the aircraft or its on-board network. This means that the door can also be operated automatically via the on-board network over the communication interface.

It is advantageous that the control and information system can be used to provide a lavatory, possibly networked with the aircraft or its on-board network, with an automatically activated door, wherein the activation can be carried out by users or authorized entities in different ways or with different authorizations.

In a preferred embodiment of the invention, the human-machine interface comprises a display device. For example, the display device is designed as a monitor or a display, optionally additionally having an appropriate hardware platform. Preferably, the display device contains a touch screen for touch-sensitive activation. The display device can also contain a loudspeaker device or function for audio output.

The display device is optionally designed to display the input information of the authorized entity. Optionally, and if any output information is available at all, the display device is also configured to display or output the output information of the control device. As an additional option, the display device is also configured to indicate the user's triggering action and/or triggering actions to be initiated by the user. Alternatively or additionally, the human-machine interface also comprises at least one of the communication interfaces.

In this way, some or even all communication via the relevant communication interface can also take place at the location of the human-machine interface. Thus, a single location is available, namely the human-machine interface, which enables the user, but also persons of the authorized entity, to operate the door or its associated components from there in a consistent manner. It is also possible that the communication interface is accommodated together with the display device and a sensor device (see below) in a housing of the human-machine interface. The communication interface preferably communicates with at least one external device assigned to the authorized entity in order to output messages/data there, and/or is communicatively connected to the display device in order to output messages there. The "external device" is in particular a laptop, tablet, smartphone, special hardware device, a memory or other device communicating with the communication interface, which is carried by authorized persons etc. or is itself authorized.

For example, the crew or the service personnel of the aircraft can log on to the human-machine interface by entering a password on a touch screen of the human-machine interface, or contactlessly by means of near field communication (NFC). The communication interface or control device can also be accessed, for example, via an authorized external device (tablet, laptop, etc.) connected to the communication interface via WLAN/RFID.

Of course, all of this also applies analogously to communication interfaces that are not integrated in the human-machine interface.

In another preferred embodiment of the invention, one of the authorized entities is an on-board network of the aircraft and at least one of the communication interfaces is configured for communication with the on-board network. This communication interface is therefore configured to exchange the input/output information between the on-board network and the control device.

In sum, the crew or the authorized personnel/on-board network can thus exchange input/output information with the control device via the communication interface. Preferably, the control device controls the display device to display the input/output information.

The input information may be, for example, commands from the authorized person or the on-board computer which will deactivate the control device, in particular power off the control device, and allow the door to be manually unlocked and opened. This is an advantage in an emergency, for example, in particular if a person is in difficulty in the lavatory and can no longer unlock and open the lavatory door independently. It is also possible for the authorized person or the on-board computer to enter commands as input information in order to carry out necessary maintenance and/or cleaning procedures in the lavatory. In this case, the door may be closed and locked by the crew and/or the staff for a certain period in order to carry out the procedures in the lavatory and to prevent a person from entering the lavatory during the procedures.

The input information can also be files or contents on a storage medium, which are transferred by an airline as an authorized entity to the control device and then stored, for example, in a memory of the human-machine interface. In particular, the content of the files or the storage medium can contain, for example, individual displays that are called up and implemented by the control device or displayed on the display device.

The human-machine interface can therefore be assigned a memory which is connected in particular to the control device and, for example, also integrated in it.

The input information can also be aircraft-related and/or flight-phase dependent commands of the on-board network.

In a preferred embodiment, the input information is therefore that which is automatically transmitted from the authorized on-board network to the control device during certain phases of the flight. For example, during the flight phases "taxi", "take-off" or "landing", during periods of "turbulence" or when the seat-belt sign is switched on etc., the door can be automatically closed and locked by means of the control device on the basis of the aircraft-related and/or flight-phase dependent commands. This can be used advantageously to prevent the use of the lavatory during certain phases of the flight, thus increasing the safety of the passengers on board. The cabin crew is then relieved of this task.

In a preferred embodiment of the invention, the communication interface is also configured to transmit the output information from the control device to the authorized entity. In particular, the output information can be displayed, e.g. on the display device, as characters, text, images and/or video. Optionally, it is also possible for the output information to be output as audio outputs via an optional loudspeaker function, e.g. of the display device. Preferably, the control device controls the display/output of the output information on the display device.

For example, the output information comprises a door status, e.g. indicating whether the door is open or closed and/or unlocked or locked. The output information can also include information about actions to be initiated by a user of the door. For example, the output information can include a warning that the door is closed and still needs to be locked, or that the door is locked and must first be unlocked in order to open it.

The output information can also be individual displays that are/have been stored in the memory. The individual displays can include, for example, flight-dependent messages in text form, video sequences, greeting or farewell phrases, pictograms and/or logos or similar. For example, the individual displays can be activated by the control device in a time-controlled manner for display on the display device. Within the scope of the invention, it is also possible for the individual displays to be displayed in certain flight phases of the aircraft.

In a particularly preferred embodiment of the invention, the human-machine interface contains a sensor device. The sensor device contains at least one optical proximity sensor, e.g. time-of-flight sensor, infrared sensors, and/or a capacitive proximity sensor. The sensor is then used to detect a touchless approach by the user and/or a gesture as a triggering action. For example, the touchless approach by the user is a specific form of approach.

Preferably, the specific approach includes a time-dependent dwell time at a defined distance in front of the sensor device, e.g. the hand of a user must be held in front of the sensor device for a certain period of time. For example, accidental triggering of the sensor device by passing the proximity sensor or by the user standing in front of the proximity sensor can thus be detected and prevented. In particular, the touchless approach by the user forms the triggering action that can be transmitted to the control device as a trigger signal for controlling the door actuator and the lock actuator.

A touchless gesture by the user, which can be detected by the sensor device, can be, for example, a swiping movement with the user's hand in front of the sensor device. In particular, the touchless gesture forms the triggering action that can be transmitted to the control device as a trigger signal for controlling the door actuator and the lock actuator.

The advantage is that the user and the authorized entity can close, lock and unlock the doors without touching them by means of the triggering action. In particular, hygienic aspects and measures to assist disabled people can be implemented by means of the actuating device. Another advantage is that the display device can be controlled by means of the control device to display the output information, in particular the door status, on the basis of the trigger signal. This means that the user and the authorized entity can be kept up-to-date on the controlled actions of the door and/or informed of measures to be taken to operate the door.

In particular, if the display device is a touch screen, the triggering action can also be performed manually by the user, in particular by an appropriate touch-sensitive input on the touch screen. Alternatively or optionally in addition, the touch screen can also be used to enter the input information (and, for example, the authorization, such as a numerical code, fingerprint, etc.) by the authorized entity and to transmit it to the control device. In particular, an individual configuration of the output information by the authorized entity is possible.

In a preferred embodiment of the invention, the control and information system comprises multiple, for example two or three, human-machine interfaces. Preferably, one of the human-machine interfaces is arranged on one side of the door, in particular outside the lavatory, and at least one other human-machine interface is arranged on the other side of the door, in particular inside the lavatory. This advantageously ensures that the user can carry out the triggering action on both sides of the door. This also ensures that the authorized entity has access to the displays output via the display device on both sides of the door, via the communication interface integrated there, by entering the appropriate input information.

Within the scope of the invention, it is preferable that the control and information system comprises an emergency unlocking device. Preferably, manual locking and unlocking and/or manual opening and closing of the doors can be performed using the emergency unlocking device. In particular, the control device can be deactivated by operating the emergency unlocking device, e.g. by powering it off, and/or it is controlled to open or close the door. The emergency unlocking device preferably contains at least one control button to initiate the procedures described, including those relating to the control device or to deactivating the control device. In particular, it also contains at least one switch for triggering the unlocking or locking, preferably from outside the lavatory.

One possible embodiment of the invention provides that the control device comprises an evaluation device. Preferably, the evaluation device is configured to evaluate the trigger signal. As an alternative or in addition, the evaluation device is configured to receive or determine operating data of the door actuator and the lock actuator and to evaluate it. For example, the operating data contains operating times and/or a drive torque of the door actuator and the lock actuator, and/or energy consumed to operate the door actuator and the lock actuator. Preferably, an operating state of the control and information system can be evaluated on the basis of the evaluated operating data, in particular by the evaluation device. It is possible within the scope of the invention that an operationally induced wear of components of the control and information system, such as the door actuator or the lock actuator, can be detected on the basis of the operating state and used to control internal error handling by the control device. In the event that the internal error handling cannot be successfully performed, the control device is preferably configured to switch off the corresponding components.

In a preferred embodiment of the invention, the operating state can be transmitted to the authorized entity via the communication interface, in particular by means of the control device. In particular, the operating state can be transmitted to the external output device and/or the on-board network for reporting emergencies, a door blockage and/or necessary maintenance procedures. Alternatively or as an option, the operating state can be displayed on the display device. This allows the authorized entity and/or the user to be informed of the operating state. It is advantageous that the operating state can be transmitted to the authorized entity at an early stage so that immediate or timely coordinated measures can be taken.

For example, the operating times and the operating state evaluated from them can be used to deduce how often the door was actuated and the lavatory was used. In particular, from this information it is possible to deduce whether and when the lavatory needs to be cleaned and/or maintained. For example, the speed of the door actuator can be used to calculate a drive torque with which the door is opened and closed. From this it is possible to check whether the speed and/or the drive torque meet the safety standards. Movement profiles can be implemented on the basis of which the door actuator and/or the lock actuator can be controlled. This way, anti-jamming measures can be implemented and injuries to the user, crew and/or personnel can be prevented.

Within the scope of the invention, it is also possible that a normal usage time of the lavatory is stored in the memory of the human-machine interface as input information, wherein the usage time can be determined, in particular by the evaluation device, e.g. on the basis of times at which the door is closed and locked from inside the lavatory and unlocked and opened again from inside the lavatory. Optionally, a timer can be integrated in the evaluation device to determine the usage time. The timer is preferably started when the door is locked, in particular from within the lavatory to be locked, and reset when the door is unlocked. In an alternative variant, the timer can also be reset if one of the components integrated in the lavatory is operated.

A detected overrun of the stored usage period can indicate an emergency in the lavatory, so that appropriate assistance measures can be initiated, in particular after notification to the authorized entity. For example, the crew and/or personnel can use the control device to unlock the door and provide assistance. Alternatively, the crew and/or personnel can unlock and open the door manually, or optionally via the emergency unlocking device, and provide the necessary assistance. Within the scope of the invention, it is possible for the control device to detect the actuation of the emergency unlocking device and to initiate the opening or closing of the door. Alternatively, within the scope of the invention, it is possible for the control device to be deactivated during and/or by actuating, in particular powering off, the emergency unlocking device.

The operating state can preferably also be used to detect a failure of the door actuator and/or the lock actuator, a power outage of the control device or any other defect in components of the control and information system, and to inform the authorized entity. The advantage is that cleaning, maintenance, repair and/or auxiliary measures based on the transmitted operating state can be initiated by the authorized body safely and in good time. In the event of failure of at least one component of the control and information system, the control and information system can continue to be used in a restricted mode, i.e. without operation of the respective component.

In one possible practical implementation of the invention the door actuator contains a position sensor. Preferably, the position sensor is configured to detect an actual door position, for example open, closed, partially open, etc., and to transmit the door position to the control device as a position signal. Preferably, the control device is configured to control the door actuator depending on the position signal.

A preferred practical implementation of the invention provides that the lock actuator contains a reset device, for example a compression spring. Preferably, when the control device is inactive or deactivated, the locking element can be released from the locking position by means of the reset device and can be returned to a starting position. This means that it can be advantageously ensured that the door is unlocked when the control device is inactive, for example due to a power failure or defect.

An alternative practical implementation of the invention provides that the lock actuator is accessible from at least one side of the lavatory, preferably from both sides of the lavatory, and can be manually locked and unlocked. This means it can be advantageously ensured that the door can be manually locked and unlocked. This is particularly advantageous if the control device is inactive, for example due to a power failure or defect.

In another possible practical implementation of the invention, the lock actuator contains an additional position sensor. Preferably, the additional position sensor is configured to detect an actual position of the locking element, in particular the locking position or starting position, and to transmit it to the control device as an additional position signal. Preferably, the control device is configured to control the lock actuator depending on the additional position signal.

The object of the invention is also achieved by a lavatory as claimed in the independent lavatory claim of an aircraft and/or for proper integration into an aircraft, in particular into a cabin of the aircraft. The lavatory has a wall structure, the wall structure enclosing at least sections of the lavatory. The lavatory has a door arranged in the wall structure. The lavatory contains the control and information system according to the invention.

The lavatory and at least some of its possible embodiments together with the respective advantages have already been described mutatis mutandis in connection with the control and information system according to the invention.

The object of the invention is also achieved by an aircraft as claimed in the independent aircraft claim having the lavatory according to the invention.

The aircraft and at least some of its possible embodiments together with the respective advantages have already been described mutatis mutandis in connection with the control and information system according to the invention and the lavatory according to the invention.

The object of the invention is also achieved by a method, in particular in the form of a control and information method, as claimed in the independent method claim. The method is carried out by means of the control and information system according to the invention or the lavatory or the aircraft and is used to control the door of the aircraft lavatory and to exchange information about the lavatory, in particular between the control device and a corresponding remote entity, namely the user and/or the authorized entity.

As part of the method, the control device controls the door actuator to open or close the door or to lock or unlock the door, based on the triggering action of the user detected by the human-machine interfaces. As part of the method, input information from the authorized entity is transmitted to the control device using the at least one communication interface and, optionally, output information from the control device is also transmitted to the authorized entity.

The method and at least some of its possible embodiments together with the respective advantages have already been described mutatis mutandis in connection with the control and information system according to the invention, the lavatory according to the invention and the aircraft according to the invention.

The invention is based on the following findings, observations or considerations and has the following further embodiments. The embodiments of the invention are sometimes also referred to simplistically as "the invention". The embodiments can also contain parts or combinations of the above embodiments, or correspond to these and/or, where appropriate, also include embodiments not previously mentioned.

According to the invention, so-called "smart features" are obtained for a door of a lavatory that can be operated and locked in particular without touch ("Touchless Door and Lock" and/or "Automatic Door Lock").

In particular, remote-controlled locking is possible, namely via the communication interface to the on-board network ("remote locking"). The aim is to relieve the crew in stressful situations. This is the case in the following context: The lavatories (bathrooms) must be locked from outside the lavatory before the flight phases "taxi", "take-off" and "landing" as well as during periods of turbulence. At the same time, the lavatory should not be occupied.

In addition to manual locking by the crew (special rights, as an authorized entity) from outside each lavatory, the door can be locked and then unlocked by remote control (via the on-board network communication interface).

A command can be input via an (external) communication interface (e.g. to the cabin management system or to a networked application of the airline via laptop, tablet or smartphone, etc. as an authorized entity). Alternatively, the aircraft (on-board network) can obtain the corresponding flight phases/states, as well as weather data, such as turbulent weather (current or predicted), and the lavatory can be locked or unlocked depending on the context (on-board network communication interface).

In particular, remote locking is performed as soon as the lavatory is unlocked and closed. A person in the lavatory that has been externally locked (by an authorized entity) can be identified by detecting the interaction of any device in the lavatory (e.g.: sensors and their manual movement, or the use of actuators in the case of manual use). In case of doubt, a "locked-in person" can always leave the lavatory that has been locked remotely (by an authorized entity), i.e. unlocking by the user or the authorized entity from inside the lavatory is always permitted (e.g. in conjunction with immediate automatic re-locking after the person has left the lavatory or closed the door). Therefore, "locking a person in" is not critical.

The invention also enables a so-called "User Alert" to be implemented.

The aim of this is to indicate possible medical emergencies by issuing a warning to the authorized entity, e.g. the crew via the external communication interface (i.e. to the on-board network, e.g. cabin management system or networked application of the airline).

A counter (timer) starts when a person locks the door from the inside. The reason for this is that otherwise, a manual locking could also have been performed by the crew from outside the lavatory as a "taxi", "take-off" or "landing" preparation or in the event of turbulence. Alternatively, the timer starts when the lavatory is locked and no remote locking (see above) is active. In this case, manual usage can also be detected, but a false alarm will occur if the door has been manually locked from the outside by the crew. In the latter case, the false alarm can be made less likely if the user alert reports a specific flight phase or turbulent weather in which locking is appropriate via an external communication interface (again e.g. cabin management system or networked airline application). This also applies if the crew has manually locked the lavatory.

The user's status can then be determined by the interaction of the various pieces of equipment (see above under "Remote Locking"). The timer is reset when a piece of equipment (e.g. touchless switch or actuator) in the lavatory has been moved/actuated.

A suitable time until the alarm is triggered can be configured by the authorized entity via the (external) communication interface (e.g. to the cabin management system or the networked airline application). Due to the contextual recognition of user behavior, the interval between certain actions (e.g. opening the toilet lid, closing the toilet lid, flushing the toilet) can be longer.

The invention also enables an off-mode and error detection.

Some or all of the equipment in the lavatory can be switched off remotely via the communication interface for maintenance and/or cleaning purposes. This can optionally also be carried out locally on the device. In principle, the system can detect and respond to error states.

For predictive maintenance, all relevant data (e.g. time stamps, actuator cycles, power consumption, temperature, pressure) can be sent via the communication interface (e.g. cabin management system or networked airline application) to a storage location, e.g. a so-called "data lake", or, for example, stored in the aforementioned memory. From there, the data is then transmitted, in particular, to a maintenance system, which can predict defects and track usage patterns.

According to the invention, an intuitive sensor concept is produced. The user does not need to know any complex gestures, but instead, for example, simply holds their hand in a certain region in front of a sensor of the human-machine interface for a short time. This avoids false triggering events, such as a person passing by. The sensors have built-in pictograms, for example, making their use particularly intuitive.

According to the invention, an emergency unlocking device, e.g. with an electromechanical switch, can be optionally provided. When activated, for example, the lock actuator is powered off. In particular, the door can be manually operated and overridden at any time both in the active mode (the door actuator is energized) and passive mode (de-energized). The drives are therefore in particular non-self-locking and can be moved manually. This is a requirement on both the door actuator and the lock actuator. Optionally, a return spring can return the actuator to the unlocked position. Alternatively, this spring can be omitted. The actuator is then accessible on both sides of the lavatory and can be adjusted manually.

The invention explicitly provides an interface for aircraft- and cabin-based systems, namely the authorized entity in the form of the on-board network. This therefore represents a second operator interface, in addition to other communication interfaces (including the human-machine interface), which are configured in particular as touchless sensors in order to enable additional functions. The authorized entity, e.g. the crew, can provide inputs for the control device, display device, human-machine interface etc. and obtain information. The communication interface/human-machine interface is one such interface to the (central) control device.

If the control and information system is installed in a lavatory or in an aircraft, the communication interface does not absolutely need to be used. The invention can therefore also be used as a stand-alone solution (=no communication interface connected to a remote station).

The door drive and lock function are separated according to the invention. Therefore, the mechanical lock and, for example, an integrated linear actuator can be manually overridden, as described above.

In particular, a direct drive (door actuator) and for the door lock actuator a steeply pitched thread or low-friction ball screw are provided.

The invention permits the following described emergency mechanisms.

A "manual override" can always be performed. Either the emergency unlocking device is actuated, which unlocks the lavatory, or alternatively, the lock actuator is accessible from both sides of the lavatory (outside, inside) and can be moved manually.

According to the invention, a connection to the cabin is enabled (for data processing).

One of the main advantages of the invention is the cabin connection, i.e. the connection of the control device to an authorized entity (inter alia, cabin crew, cabin management system, airline application, e.g. via WLAN). This enables the transmission of usage data via the communication interface to a connected server/data store (data lake). The control and information system can also be retrofitted without a cabin connection, see above.

Other features which are considered as characteristic for the invention are set forth in the appended claims.

Although the invention is illustrated and described herein as embodied in a controlling a lavatory door by a user and authorized entities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding or equivalent parts are labeled with the same reference signs in all figures.

Figure 1:
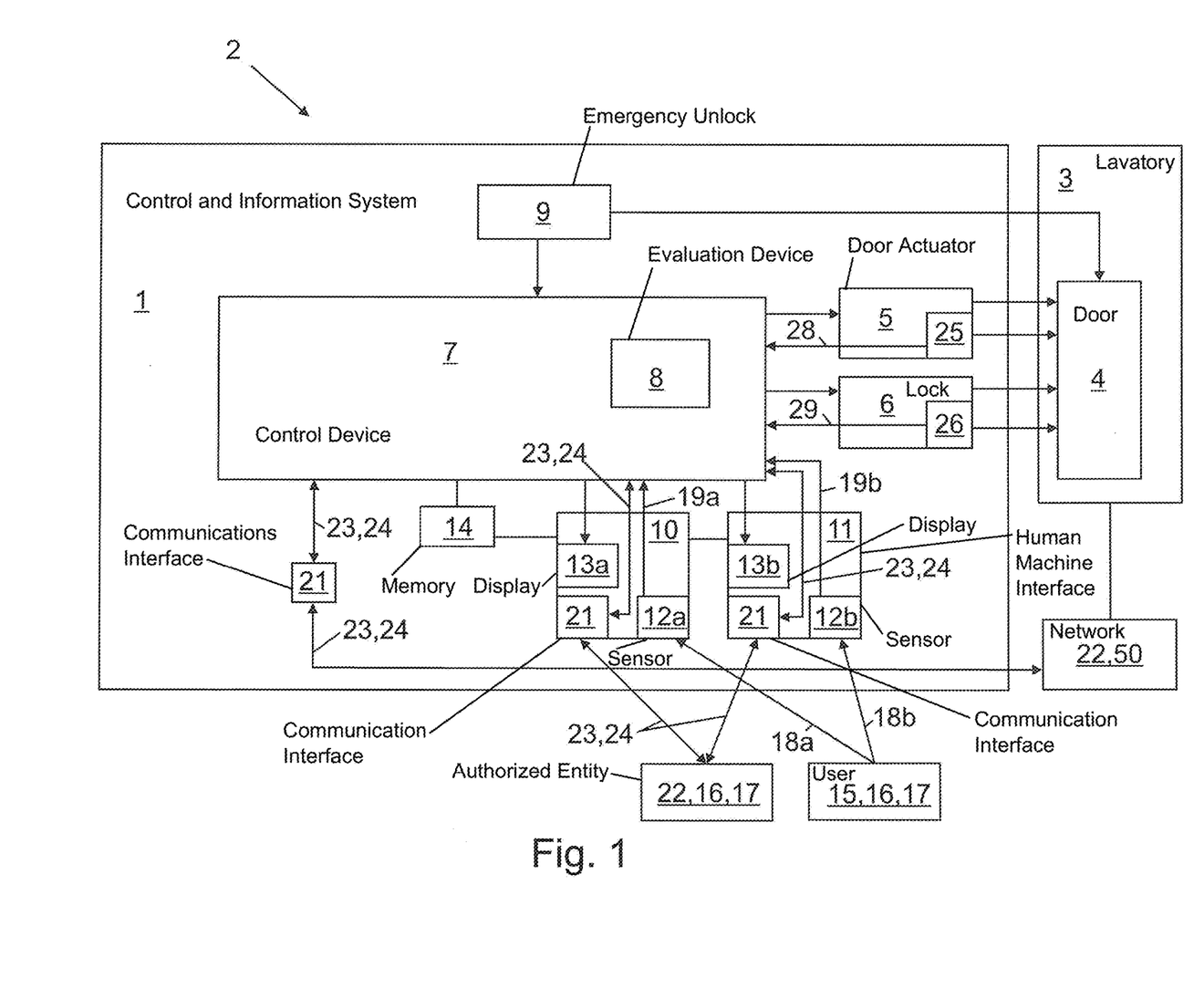
FIG. 1 is a block diagram showing a control and information system within a system architecture with an aircraft and a lavatory with door arranged in the aircraft.

Referring now to the figures of the drawings in detail and first, particularly to FIG. 1 thereof, there is shown a control and information system 1, which is integrated into a system architecture. The system architecture here is an aircraft 2, namely a passenger aircraft, with an on-board network 50 configured for data-processing, here symbolized by an on-board computer, and a lavatory 3. The lavatory 3 is supplied by a power supply, not shown, of the aircraft 2 and is communicatively connected via a data bus to the on-board network 50 and thus integrated into the data and communication systems of the aircraft 2.

The lavatory 3 has a door 4, which is arranged in a wall structure, not shown, surrounding the lavatory 3. According to FIGS. 3 and 4, the door 4 is designed as a folding door with a plurality of door leaves 30, the door leaves 30 being pivotably connected to one another by door hinges 31. The lavatory 3 can be entered and exited by people via the door 4. The lavatory 3 is integrated into a cabin of the aircraft 2.

The control and information system 1 is configured to control the door 4 and to exchange information describing a status of the lavatory 3 with the lavatory 3. It contains a door actuator 5, a lock actuator 6, a control device 7 with an evaluation device 8, and an emergency unlocking device 9. The control device 7 is also supplied by the power supply of the aircraft 2 and is communicatively connected via a data bus to the on-board network 50 and thus integrated into the data and communication systems of the aircraft 2.

The emergency unlocking device 9 contains a control button, not shown, for deactivating and/or disconnecting the power supply from the control device 7, and a switch, not shown, for actuating the lock actuator 6, in particular from outside the lavatory 3. This means that the door 4 can be opened and closed with the aid of the emergency unlocking device 9 even in the event of a power failure or other malfunctions and the control device 7 can be shut down (symbolized by arrows).

The control and information system 1 contains a plurality of human-machine interfaces, here a first human-machine interface 10 and a second human-machine interface 11. The first human-machine interface 10 contains a sensor device 12a and the second human-machine interface 10 contains a second sensor device 12b. The sensor devices 12a, 12b have a sensor, not shown in detail, which here is a capacitive proximity sensor, alternatively an optical sensor, namely a time-of-flight sensor. Each human-machine interface 10, 11 also has a respective display device 13a, 13b. The display device 13a, 13b is configured here as a display, alternatively as a monitor. It contains a touch screen which allows people to enter data and output display content and/or audio content. The human-machine interfaces 10, 11 are connected to a shared memory 14, which in turn is connected to the control device 7. Each of the human-machine interfaces 10, 11 additionally has a communication interface 21. This is used for communication between an authorized entity 22 and the control device 7.

The first human-machine interface 10 is arranged on a first side of the door 4 outside the lavatory 3, and the second human-machine interface 10 is arranged on another side of the door 4, in particular inside the lavatory 3.

For example, during a flight a user 15 of the door 4 in the form of a passenger and a cabin crew member 16 in the form of a flight attendant are present in the aircraft 2. In addition, while the aircraft 2 is at a standstill, service personnel 17 in the form of a cleaner is present in the aircraft 2. The cabin crew 16, the service personnel 17 and the on-board network 50 of the aircraft 2 form a specially authorized entity, i.e. with special rights 22 with regard to the door 4, within the system structure or the aircraft 2. The user 15, on the other hand, is a "non-specially authorized user" of the door 4. The user 15 therefore only has standard rights to use the door 4.

From outside the lavatory 3 the user 15 can only close the open door 4 via the human-machine interface 10 and open the unlocked door 4 to enter the toilet cubicle 3 (standard rights). For this purpose, the first sensor device 12a detects a triggering action 18a by the user 15, here the swipe gesture 20 described in FIG. 2. The user 15 can close the open door 4 from inside the lavatory 3 via the human-machine interface 11 and lock or unlock the closed door 4 from inside the lavatory 3 in order to use the lavatory 3 as required (standard rights). For this purpose, the second sensor device 12b detects a triggering action 18b by the user 15, here again the swipe gesture 20. Authorized entities 22 in the form of persons (flight personnel 16, service personnel 17) can also carry out the triggering actions 18a, 18b in a corresponding manner without using their special authorization. In this function they are equivalent to "normal" users 15 and only have the standard rights.

The triggering action 18a, 18b is alternatively also a simple approaching of the sensor device 12a, 12b by the user 15. The swipe gesture 20 is a swiping movement with the hand of the user 15 in front of the sensor device 12a, 12b, as explained in relation to FIG. 2. Alternatively or optionally, the triggering action 18a, 18b can be additionally carried out by a corresponding input by the user 15 on the touch screen of the display device 13, e.g. by touching a "Door open/close" or "Door lock/unlock" symbol.

The respective sensor device 12a, 12b transmits the triggering actions 18a, 18b as trigger signal 19a, 19b to the control device 7. The control device 7 controls the door actuator 5 on the basis of the trigger signals 19a, 19b accordingly to open or close the door 4. It also controls the lock actuator 6 based on the trigger signal 19a, 19b to lock or unlock the door 4.

Figure 3:
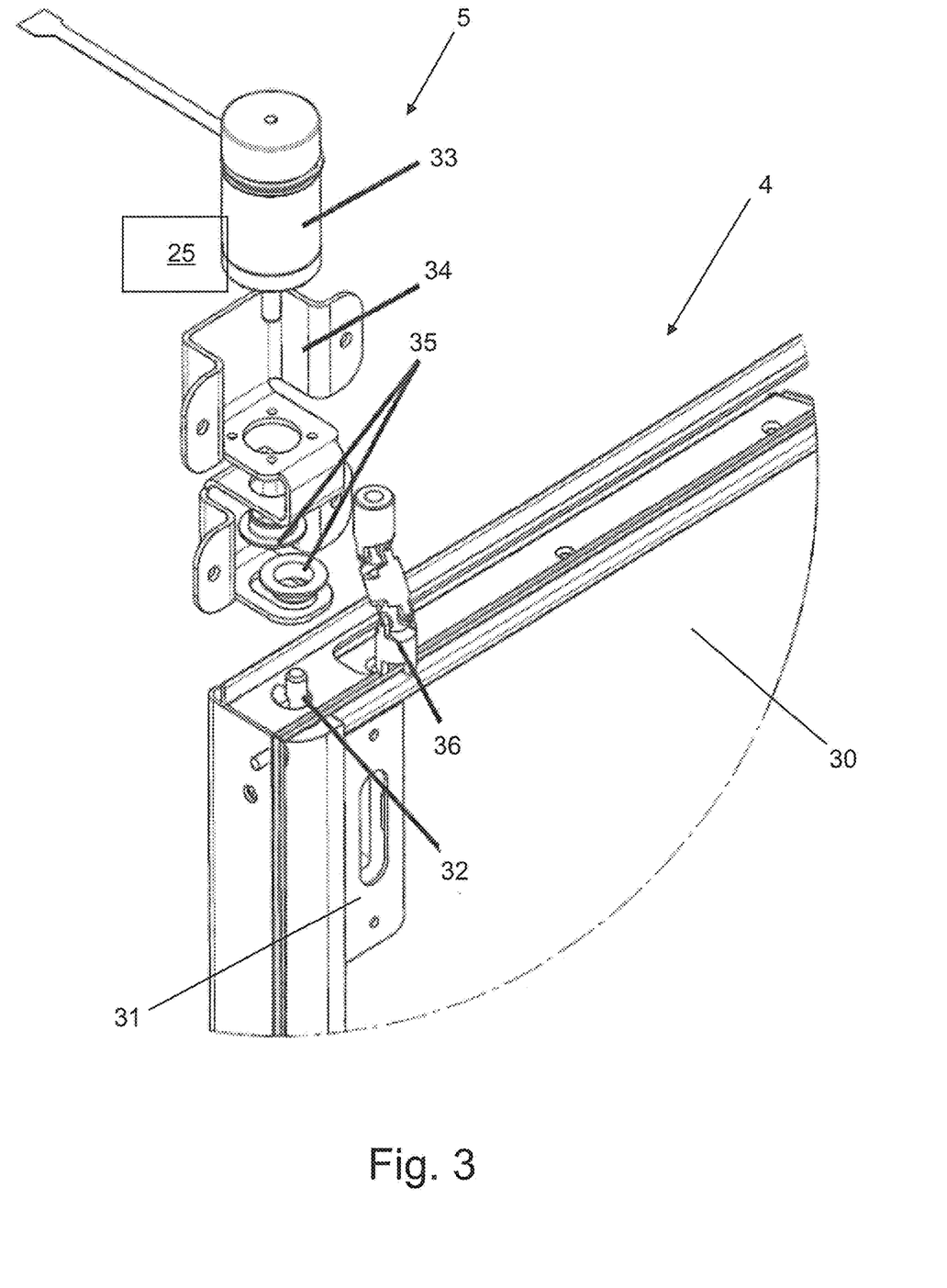
FIG. 3 is an exploded, perspective view of a door actuator of the control and information system for opening and closing the lavatory door.
Figure 4:
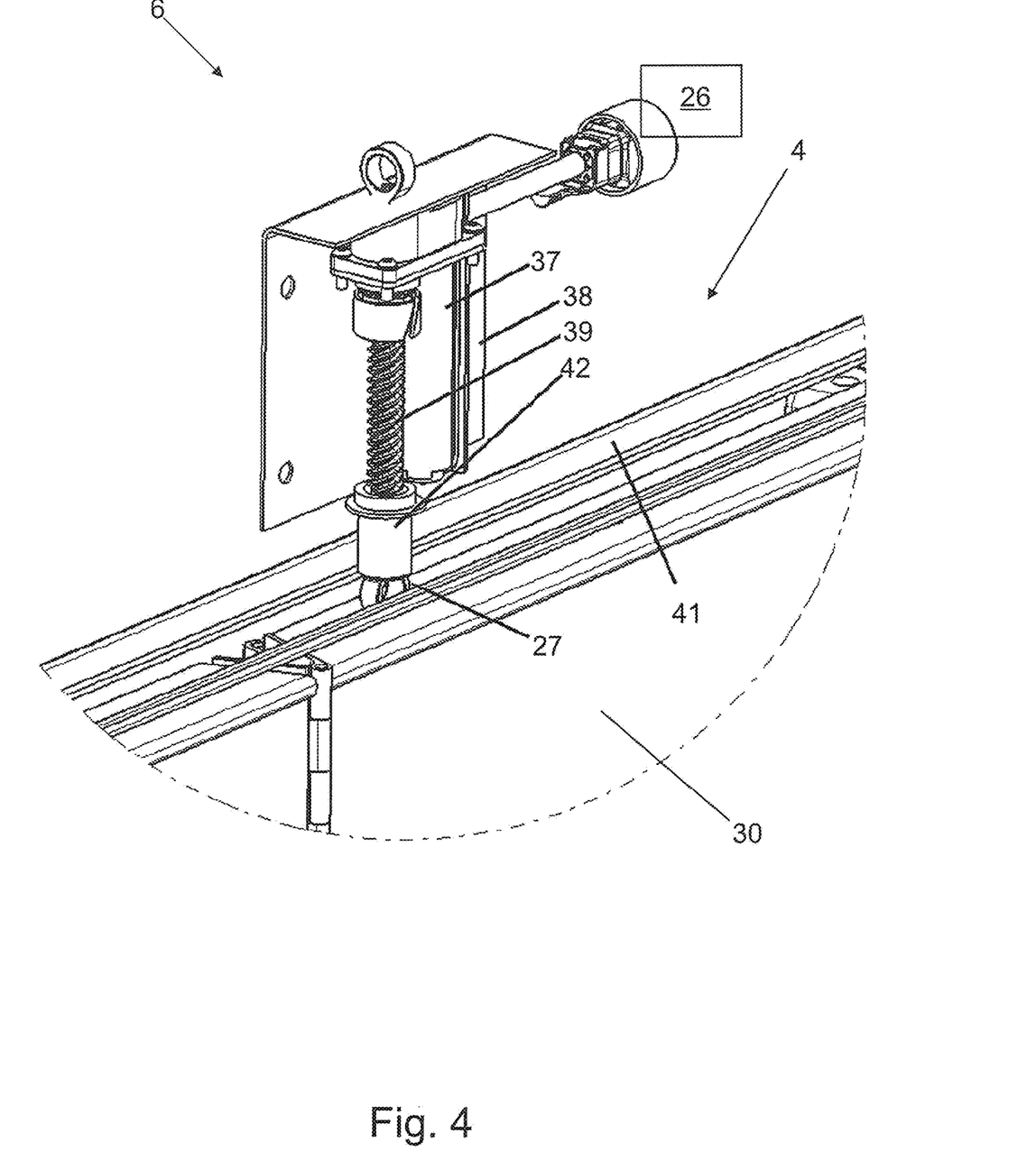
FIG. 4 is a perspective view of a lock actuator of the control and information system for locking and unlocking the lavatory door.

The door actuator 5 and the lock actuator 6 comprise position sensors 25, 26 (see also FIGS. 3 and 4). The position sensor 25 of the door actuator 5 detects a current actual position of the door 4, in particular whether the door 4 is open, partially open, or closed. The position sensor 26 of the lock actuator 6 detects a position of a locking element 27 of the lock actuator 6 (see FIG. 4) and thus, in particular, whether the door 4 is locked or unlocked.

The position of the door 4 and the position of the locking element 27 are transmitted by the position sensors 25, 26 as position signals 28, 29 to the control device 7. The evaluation device 8 evaluates the position signal 28 transmitted by the door actuator 5 and the position signal 29 transmitted by the lock actuator 6. The control device 7 controls the door actuator 5 depending on the position signal 28 to generate a torque for opening or closing the door 4. The control device 7 controls the lock actuator 6 depending on the position signal 29 to move the locking element 27 into a locked position or into a starting position in order to lock or unlock the door 4.

The control device 7 also controls the display devices 13a, 13b to output corresponding information, e.g. to display triggering actions 18a, 18b to be initiated. The triggering actions 18a, 18b to be initiated are, in particular, prompts to the users about the next actions to be implemented. The control device 7 also controls the display devices 13a, 13b to indicate the triggering actions 18a, 18b which a user 15 or the authorized entity 22 has already carried out. Furthermore, the control device 7 can control the display device 13a, 13b to display the current door status, in particular whether the door is open, closed, unlocked or locked.

By integrating the communication interface 21 into the two human-machine interfaces 10, 11, it is also possible for an authorized entity 22 in the form of a person to exchange information with the control device 7. Input information 23 from the authorized entity 22 can be communicated to the control device 7 and output information 24 can be transmitted from the control device 7 to the authorized entity 22. This can again be achieved via the display devices 13a, 13b, the sensor devices 12a, 12b, but also via other forms of communication, e.g. RFID/WLAN/NFC etc., if appropriate communication facilities are provided in the human-machine interfaces 10, 11 and the authorized entities 22 are accordingly equipped for such communication. If applicable, the display devices 13a, 13b and/or the sensor devices 12a, 12b are thus also parts of the communication interfaces 21 or have a dual functionality corresponding to the above-mentioned functionalities.

The input information 23 also includes commands from the authorized entity 22, which ensure specially authorized access to the control device 7 by the authorized entity 22. The authorized entity 22 can use the input information 23 to have the control device 7, for example, activate the door actuator 5 and/or the lock actuator 6 in the same way but with special authorization, for example, the door 4 can then also be locked or unlocked from the human-machine interface 10 from outside the lavatory 3 as a special right, which is not possible for the user 15 with their standard rights. This is used, for example, depending on specific flight phases such as "taxi", "take-off", "landing" and/or during periods of turbulence that the aircraft 2 encounters during the flight. For maintaining and/or cleaning the lavatory 3, the authorized entity 22 (e.g. service personnel 17) can also transmit appropriate input information 23 to the control device 7.

Furthermore, the control device 7 can be deactivated, in particular powered off, by the authorized entity 22 using the input information 23. This can occur in particular if a malfunction of components of the control and information system 1 or an emergency occurs. In this case, for example, a person can also operate the emergency unlocking device 9 to unlock and open the door 4 manually.

The authorized entity 22 may enter the input information 23 via the touch screen of the display device 13a, 13b and transfer it to the control device 7. Via the touch screen and/or other channels of the communication interfaces 21 (WLAN, RFID, NFC, . . . , see above), the authorized entity 22 can also store contents of files and/or storage media in the memory 14, which can be retrieved by the control device 7. For this purpose, an extended special authorization, for example by entering a password, may be required by the authorized entity 22, e.g. to further restrict the group of persons authorized to do so. Communication via the communication interface 21, in particular the extended authorization, can be carried out via the touch screen or via NFC (near field communication) with the corresponding human-machine interface 10, 11. The control device 7 checks the authorization and enables the authorized entity 22 to access the corresponding functionality.

The output information 24 can be output via the display device 13a, 13b or transmitted via the communication interface 21 to an external output device of the authorized entity 22, and then in particular displayed there, e.g. on a laptop of the service personnel 17. For example, the contents of the files and/or the storage media stored on the memory 14 can be displayed on the display device 13a, 13b as individual displays.

The output information 24 also comprises the implemented actions that the control device 7 has carried out as a result of the input information 23. For example, the output information 24 can be output, in particular displayed, by the user 15 in the form of the door status and/or the actions initiated or to be initiated.

The output information 24 also comprises status messages about maintenance, repair work, faults and/or emergencies that are displayed on the display device 13a, 13b and/or on the external output device of the authorized entity 22. The status messages can be generated on the basis of an operating state of the control and information system 1. The operating state can be determined based on the operating data of the door actuator 5 and/or the lock actuator 6 (e.g. position sensors 25, 26), which are detected by the control device 7 and evaluated by the evaluation device 8.

The operating data can also include operating times, energy consumption and/or drive torque of the door actuator 5 and/or the lock actuator 6. For example, on the basis of the determined operating times, the operating state can indicate that the lavatory 3 needs to be cleaned and/or maintained, and/or that there is a defect in components of the control and information system 1. If the usual operating times of the lavatory 3 stored in the control device 7 are exceeded, this may indicate in particular an emergency in the lavatory 3 or a blocked door 4. By means of the transmitted output information 24, the authorized entity 22 and also the user 15 can receive important messages and initiate appropriate measures.

The communication of the on-board network 50 as an authorized entity 22 with the control device 7 ensures, for example, the automatic locking of the door 4 depending on the flight phase, using a flight computer and sensors of the on-board network 50, for example. Here, in particular, the door 4 can be automatically manipulated or controlled without having to impose this task on personnel such as flight attendants etc., e.g. locking during the flight phases "taxi", "take-off", "landing" known in the on-board network 50, and when "turbulence" or "seat belt sign activated" is displayed.

Figure 2:
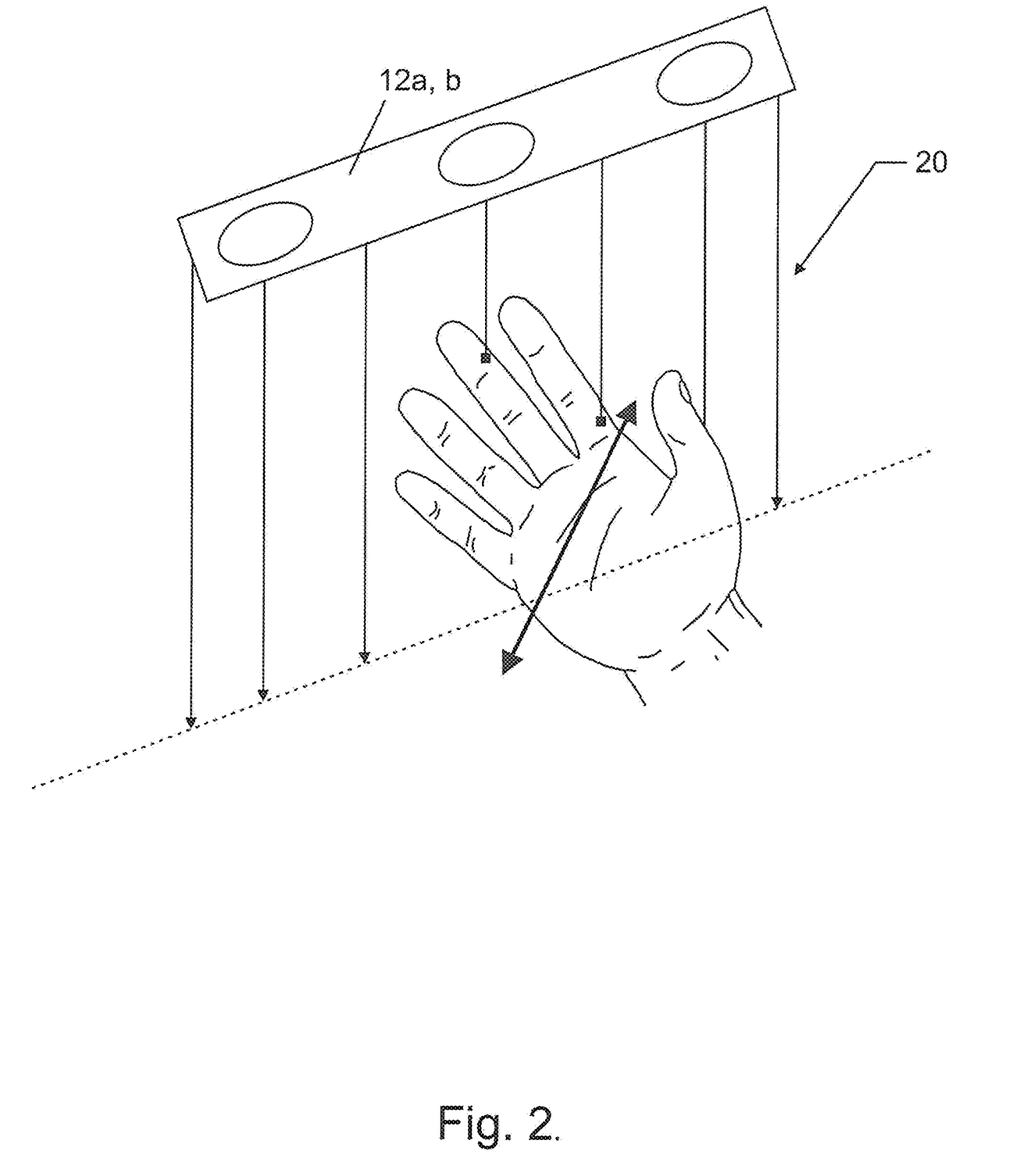
FIG. 2 is a schematic representation of a swiping gesture with one hand in front of a sensor device of the control and information system.

FIG. 2 symbolically shows a swipe gesture 20, in which a person moves their hand back and forth in front of the sensor device 12a, 12b in the direction of the double-headed arrow shown. The sensor device 12a, 12b detects this movement in a contactless manner, e.g. by electrically capacitive detection, which is indicated by arrows.

FIG. 3 shows the door actuator 5 of the control and information system 1 in an exploded diagram. The door actuator 5 is configured to open and close the door 4. A section of one of the door leaves 30 of the door 4 is also shown, wherein the door leaf 30 is fitted with a door hinge 31 and a coupling 32.

The door actuator 5 is mechanically connected to the door 4 via the coupling 32. Alternatively, the coupling 32 can be designed in such a way that the door 4 is mechanically connected to the wall structure of the lavatory 3 via the coupling 32 and the door actuator 5 is not connected to the door 4 via this coupling. It is also possible for the coupling 32 to be detached from the wall structure so that the door 4 can be removed from the wall structure.

The door actuator 5 comprises a drive unit 33 with an electric motor and a transmission for non-self-locking force transmission, a housing 34, two sliding bearings 35, and a double-shaft joint 36. The electric motor of the drive unit 33 is connected to the power supply of the control device 7 or of the aircraft 2 in a manner not shown. The double-shaft joint 36 is operatively connected to the door hinge 31. The joint transmits a torque generated by the electric motor via the transmission to the door hinge 31, so that this is actuated, the door leaf 30 is pivoted and the door 4 performs an opening or closing movement. The sliding bearings 35 are designed to absorb transverse forces as the torque is transmitted through the double-shaft joint 36 and only allow a pivoting movement of the door hinge 31.

The door actuator 5 contains the position sensor 25, only symbolically indicated here (see also FIG. 1), which detects the actual door position of the door 4 and transmits it to the control device 7 as the position signal 28.

FIG. 4 shows the lock actuator 6 and a detail of the door 4 with door leaves 30. The door leaf 30 has a guide rail 41, which guides it in the wall structure of the lavatory 3 during the opening and closing movements. The lock actuator 6 is integrated into the wall structure of the lavatory 3, in particular above the door 4. It is designed to lock and unlock the door 4 and in particular prevents manual opening of the door 4 during normal operation of the control and information system 1.

The lock actuator 6 contains a drive unit 37 with an electric motor and a transmission for non-self-locking force transmission, a housing 38, a steep-threaded spindle 39, in particular as part of the transmission, and a locking element 27. The locking element 27 is designed as a bolt. The electric motor—again not shown—is connected to the power supply network of the control device 7 or of the aircraft 2 and is energized for the entire locking period in which the door 4 is locked, provided a spring is fitted for unlocking when the power is turned off. Alternatively, the lock actuator 6 is only energized for locking and unlocking.

The torque generated by the electric motor is converted into a linear movement via the transmission, in particular via the steep-threaded spindle 39. The locking element 27 is guided in a sliding bearing 42, which prevents rotation, absorbs transverse forces of the drive unit 37, and thus enables the linear movement of the locking element 27. The locking element 27 is moved in the linear direction into the door 4, or alternatively behind it, and blocks it in a central region of the door 4, for example in the region of a central door leaf 30 of the door 4, at the door hinge 31 arranged there. In particular, this prevents the opening and closing movement of the door 4.

A reset device, not shown, in particular a compression spring, is integrated in the locking element 27. The reset device resets the locking element 27 to a starting position when the electric motor is powered off, so that the door 4 is unlocked, in particular due to safety considerations, and can be opened. In an alternative implementation, the accessible locking element 27 can be moved manually and a reset device can be omitted.

The lock actuator 6 contains the position sensor 26, symbolically indicated again here (see also FIG. 1), which detects the actual position of the locking element 27 and transmits it to the control device 7 as the position signal 29.

The following is a summary list of reference numerals and the corresponding structure used in the above description of the invention:

| | |
|---|---|
| 1 | control and information system |
| 2 | aircraft |
| 3 | lavatory |
| 4 | door |
| 5 | door actuator |
| 6 | lock actuator |
| 7 | control device |
| 8 | evaluation device |
| 9 | emergency unlocking device |
| 17 | first human-machine interface |
| 17 | second human-machine interface |
| 12a, 12b | sensor devices |
| 13a, 13b | display devices |
| 14 | memory |
| 15 | user |
| 16 | flight personnel |
| 17 | service personnel |
| 18a, 18b | triggering action |
| 19a, 19b | trigger signal |
| 20 | gesture |
| 21 | communication interface |
| 22 | authorized entity |
| 23 | input information |
| 24 | output information |
| 25 | door actuator position sensor |
| 26 | lock actuator position sensor |
| 27 | locking element |
| 28 | position signal of the door actuator position sensor |
| 29 | position signal of the lock actuator position sensor |
| 30 | door leaf |
| 31 | door hinge |
| 32 | coupling |
| 33 | door actuator drive unit |
| 34 | housing |
| 35 | sliding bearing for the double-shaft joint |
| 36 | double-shaft joint |
| 37 | lock actuator drive unit |
| 38 | housing |
| 39 | steep-pitched spindle |
| 41 | guide rail |
| 42 | sliding bearing for the locking element |
| 50 | on-board network |

The invention claimed is:

1. A control and information system for a lavatory of an aircraft, wherein the lavatory has a door, the control and information system comprising:

a door actuator for opening and closing the door;

a lock actuator for locking and unlocking the door;

a controller for controlling said door actuator and said lock actuator;

at least one human-machine interface for detecting a triggering action relating to the door by a user of the door and for transmitting the triggering action to said controller as a trigger signal; and at least one communication interface for transferring input information to said controller from an authorized entity different to the user, said at least one human machine interface containing said at least one communication interface.

2. The control and information system according to claim 1, wherein said at least one human-machine interface contains a display.

3. The control and information system according to claim 2, wherein:

the authorized entity is one of a plurality of authorized entities;

said at least one communication interface is one of a plurality of communication interfaces;

one of said authorized entities is an on-board network of the aircraft; and at least one of said communication interfaces is configured for communication with said on-board network.

4. The control and information system according to claim 1, wherein said at least one human-machine interface has a sensor, wherein said sensor has at least one optical and/or capacitive proximity sensor for detecting a touchless approach by the user and/or for detecting a touchless gesture of the user as the triggering action.

5. The control and information system according to claim 2, wherein said display is controlled on a basis of the trigger signal to display output information, wherein the output information includes a current door status and/or actions to be initiated by the user.

6. The control and information system according to claim 2, wherein said display contains a touch screen for manually inputting the triggering action by the user and/or for an individual configuration of the input information and/or output information on said display.

7. The control and information system according to claim 1, further comprising an emergency unlocking device for activating and deactivating said controller and/or said at least one of the human-machine interfaces and/or for manually locking and unlocking and/or for manually opening and closing the door.

8. The control and information system according to claim 1, wherein said controller has an evaluation device, which is configured to evaluate the trigger signal and/or to determine and evaluate operating data of said door actuator and said lock actuator.

9. The control and information system according to claim 8, wherein:

the operating data is a drive torque of said door actuator and/or an expended energy consumption and/or operating times of said door actuator and/or of said lock actuator to operate said door actuator and/or said lock actuator; and said evaluation device is configured to evaluate an operating state of the control and information system on a basis of the operating data.

10. The control and information system according to claim 9, wherein said controller is configured to use the operating state for internal error handling and/or to transmit the operating state to the authorized entity as output information for error and/or emergency notification.

11. The control and information system according to claim 1, wherein said door actuator is a drive unit used to generate and transmit a torque to a door hinge of the door, said door actuator having a position sensor for detecting a door position and for transmitting the door position as a position signal to said controller.

12. The control and information system according to claim 1, wherein:
said lock actuator has an additional drive unit and a locking element;
said locking element is transferred from a starting position to a locking position and back by means of said additional drive unit; and
said lock actuator having an additional position sensor for detecting a position of said locking element and for transmitting the position as an additional position signal to said controller.

13. The control and information system according to claim 1, wherein said at least one communication interface further transfers output information from said controller to the authorized entity.

14. The control and information system according to claim 1, wherein said display outputs the input information and/or output information.

15. A lavatory for integration into an aircraft having a wall structure that encloses at least sections of the lavatory, the lavatory comprising:
a door disposed in the wall structure and having said control and information system according to claim 1.

16. An aircraft, comprising:
said lavatory according to claim 15.

17. A method for controlling a door of a lavatory of an aircraft and for exchanging information about the lavatory with an aid of a control and information system, which comprises the steps of:
controlling, via a controller, a door actuator and a lock actuator on a basis of a triggering action of a user detected by a human-machine interface to open or close the door or to lock or unlock the door; and
transmitting, via at least one communication interface, input information from an authorized entity to the controller, the at least one human machine interface containing the at least one communication interface.

18. The method according to claim 17, which further comprises transmitting, via the at least one communication interface, output information from the controller to the authorized entity.

* * * * *